(12) United States Patent
Latta et al.

(10) Patent No.: US 9,812,046 B2
(45) Date of Patent: Nov. 7, 2017

(54) MIXED REALITY DISPLAY ACCOMMODATION

(71) Applicant: MICROSOFT TECHNOLOGY LICENSING, LLC, Redmond, WA (US)

(72) Inventors: Stephen Latta, Seattle, WA (US); Peter Tobias Kinnebrew, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 346 days.

(21) Appl. No.: 13/738,902

(22) Filed: Jan. 10, 2013

(65) Prior Publication Data

US 2014/0192084 A1    Jul. 10, 2014

(51) Int. Cl.
*G06T 11/60* (2006.01)
*G09G 3/00* (2006.01)
(Continued)

(52) U.S. Cl.
CPC ........... *G09G 3/003* (2013.01); *G02B 27/017* (2013.01); *G02B 27/22* (2013.01); *G06F 21/00* (2013.01);
(Continued)

(58) Field of Classification Search
CPC . G06T 11/60; G02B 27/017; G02B 2027/014; G02B 2027/0178;
(Continued)

(56) References Cited

U.S. PATENT DOCUMENTS 6,317,127 B1 * 11/2001 Daily ...................... G06T 15/10
345/629
7,330,197 B2    2/2008 Kobayashi et al.
(Continued)

FOREIGN PATENT DOCUMENTS

CN        102540464 A      7/2012

OTHER PUBLICATIONS

Roesner, et al., "Security and Privacy for Augmented Reality Systems", In Communications of the ACM, vol. 57, Issue 4, Nov. 30, 2012, pp. 1-10.*

(Continued)

*Primary Examiner* — Gregory J Tryder
*Assistant Examiner* — Michael Le
(74) *Attorney, Agent, or Firm* — Alleman Hall Creasman & Tuttle LLP

(57) ABSTRACT

A mixed reality accommodation system and related methods are provided. In one example, a head-mounted display device includes a plurality of sensors and a display system for presenting holographic objects. A mixed reality safety program is configured to receive a holographic object and associated content provider ID from a source. The program assigns a trust level to the object based on the content provider ID. If the trust level is less than a threshold, the object is displayed according to a first set of safety rules that provide a protective level of display restrictions. If the trust level is greater than or equal to the threshold, the object is displayed according to a second set of safety rules that provide a permissive level of display restrictions that are less than the protective level of display restrictions.

18 Claims, 6 Drawing Sheets

(51) Int. Cl.
G02B 27/22 (2006.01)
G06F 21/00 (2013.01)
G06F 21/10 (2013.01)
G06F 21/36 (2013.01)
G02B 27/01 (2006.01)
G03H 1/22 (2006.01)

(52) U.S. Cl.
CPC .............. *G06F 21/10* (2013.01); *G06F 21/36* (2013.01); *G02B 2027/014* (2013.01); *G02B 2027/0174* (2013.01); *G02B 2027/0187* (2013.01); *G03H 1/2294* (2013.01); *G03H 2001/2284* (2013.01); *G03H 2227/02* (2013.01); *G09G 2340/10* (2013.01); *G09G 2340/12* (2013.01); *G09G 2354/00* (2013.01)

(58) Field of Classification Search
CPC ............ G02B 2027/0187; G02B 27/01; G02B 2027/0174; G02B 27/22; G06F 21/10; G06F 21/00; G06F 21/36; G09G 3/003; G09G 5/00; G09G 2340/12; G09G 2340/10; G09G 5/12
USPC ........ 345/8, 77, 419, 426, 629, 633; 348/40, 348/42, 53, 158
See application file for complete search history.

(56) References Cited

U.S. PATENT DOCUMENTS

| | | | |
|---|---|---|---|
| 2002/0154214 A1 | 10/2002 | Scallie et al. | |
| 2004/0183751 A1 | 9/2004 | Dempski | |
| 2005/0138110 A1* | 6/2005 | Redlich | C07K 14/70575 709/201 |
| 2007/0273610 A1* | 11/2007 | Baillot | G02B 27/017 345/8 |
| 2009/0187575 A1* | 7/2009 | DaCosta | 707/10 |
| 2010/0103196 A1 | 4/2010 | Kumar et al. | |
| 2011/0090219 A1 | 4/2011 | Kruglick | |
| 2011/0213664 A1* | 9/2011 | Osterhout | G02B 27/017 705/14.58 |
| 2012/0093355 A1* | 4/2012 | Levien et al. | 382/100 |
| 2012/0127284 A1 | 5/2012 | Bar-Zeev et al. | |
| 2012/0249807 A1 | 10/2012 | Sugden | |

OTHER PUBLICATIONS

Shapshak, Mans., "New Approaches for Mixed Reality in Urban Environments: the Cinespace Project", Retrieved at <<http://upcommons.upc.edu/revistes/bitstream/2099/11366/1/02_PROCEEDINGS_M2_05_0014.pdf>>, 2009, pp. 269-274.

Plesniak, et al., "Tangible, Dynamic Holographic Images", Retrieved at, <<http://web.media.mit.edu/~wjp/pubs/holo-hap-wiley.pdf>>, Proceedings of the In Three-Dimensional Holographic Imaging, Eds. C.J. Kuo and M.H. Tsai, Wiley-Interscience, 2001, 2001, pp. 17.

Riva, et al., "Presence 2010: The Emergence of Ambient Intelligence", Retrieved at http://www.neurovr.org/emerging/book4/4_04RIVA.PDF>>, Retrieved Date: Apr. 2, 2012, pp. 24.

Karlekar, et al., "Mixed Reality on Mobile Devices", Retrieved at <<http://cdn.intechopen.com/pdfs/10801/InTech-Mixed_reality_on_mobile_devices.pdf>>, May, 2010, pp. 16.

Mountain, et al., "Interacting with Virtual Reality models on mobile devices", Retrieved at <<http://www.comp.lancs.ac.uk/~kc/mguides05/pdfs/mountain2005-mobileVR-mobHCI-final.pdf>>, 2005, pp. 4.

European Patent Office, International Search Report & Written Opinion for PCT Application No. PCT/US2014/010944, May 9, 2014, 12 pages.

The State Intellectual Property Office of China, First Office Action and Search Report issued in Chinese Patent Application No. 201480004506.8, May 24, 2016, China, 17 pages.

* cited by examiner

MIXED REALITY DISPLAY ACCOMMODATION

BACKGROUND

Augmented reality or mixed reality devices, such as head-mounted display devices, may be used in a variety of real-world environments and contexts. Such devices provide a view of a physical environment that is augmented by holographic objects and/or other virtual reality information. These devices may receive for display holographic objects developed by known and unknown developers, as well as holographic objects published or distributed by known and unknown sources.

A holographic object displayed by a mixed reality device may alter a user's view of the physical environment. In some examples, one holographic object may also interact with another holographic object. A holographic object may also be displayed with varying levels of realism, such as varying levels of transparency/opacity, sharpness/blur, realistic versus fanciful behavior, etc. Depending upon a holographic object's level of realism and general appearance, displaying the holographic object may alter a user's perception of the physical environment and/or divert a user's attention away from certain aspects of the physical environment. Furthermore, depending upon the real-world environment and/or context in which the mixed reality device is being used, in some cases such altered perception and/or diverted attention may lessen a user's awareness of safety-related issues in the physical environment.

SUMMARY

Various embodiments are disclosed herein that relate to displaying a holographic object to accommodate a mixed reality environment including a physical environment. In one example, a method may include providing a head-mounted display device that is configured to be worn by a user and is operatively connected to a computing device. The head-mounted display device may include a plurality of sensors and a display system. The method may include receiving physical environment data from the physical environment via one or more of the sensors. A holographic object may be received from a source, with the holographic object associated with a content provider ID. The method may include assigning a trust level to the holographic object based on the content provider ID.

If the trust level is less than a trust level threshold, then the method may include applying a first set of safety rules that provide a protective level of display restrictions for the holographic object. The method may then include displaying the holographic object via the display system according to the first set of safety rules. If the trust level is greater than or equal to the trust level threshold, then the method may include applying a second set of safety rules that provide a permissive level of display restrictions for the holographic object, with the permissive level of restrictions being less than the protective level of restrictions. The method may then include displaying the holographic object via the display system according to the second set of safety rules.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
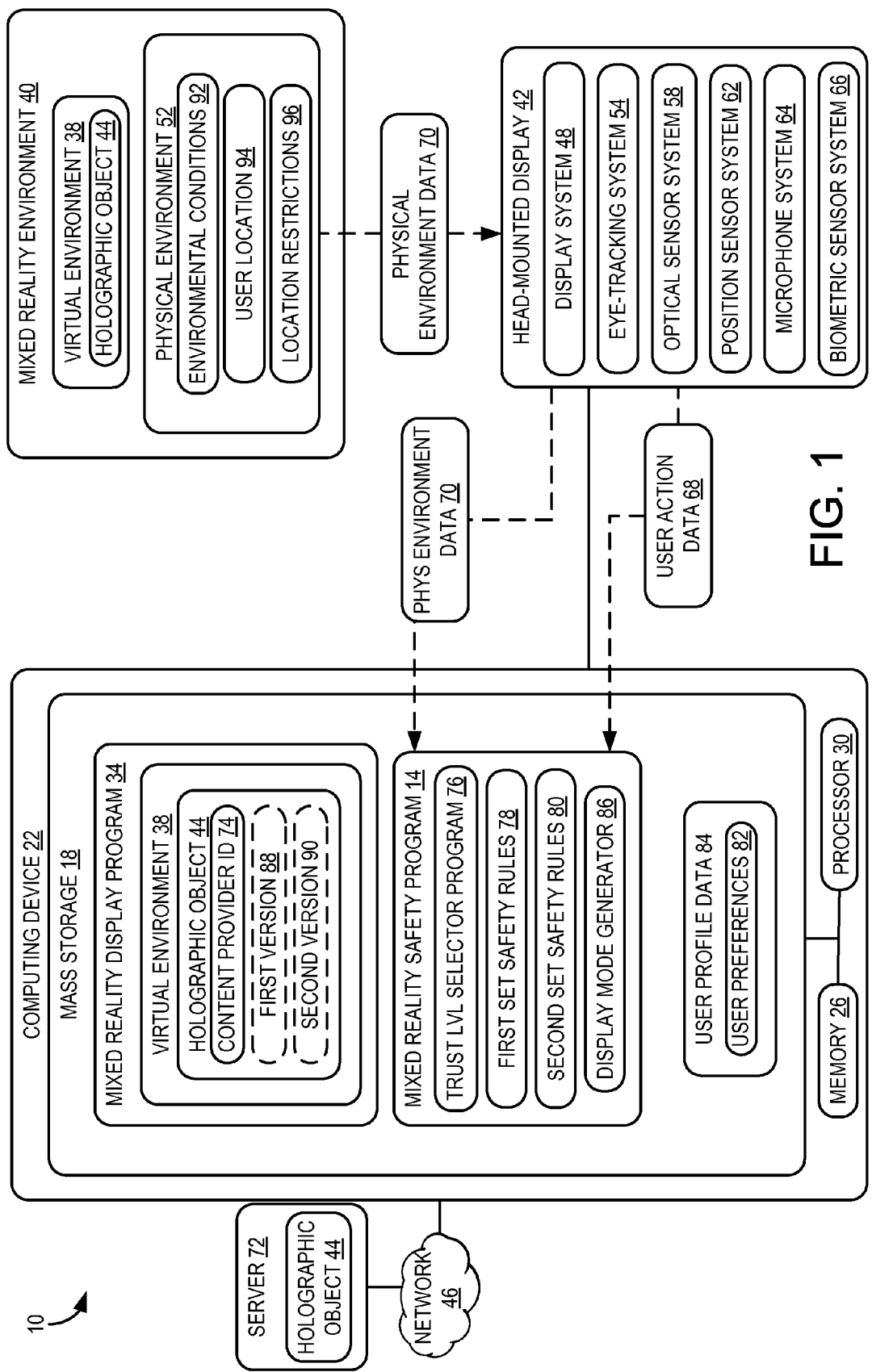
FIG. 1 is a schematic view of a mixed reality accommodation system according to an embodiment of the present disclosure.

FIG. 1 shows a schematic view of one embodiment of a mixed reality accommodation system 10. The mixed reality accommodation system 10 includes a mixed reality safety program 14 that may be stored in mass storage 18 of a computing device 22. The mixed reality safety program 14 may be loaded into memory 26 and executed by a processor 30 of the computing device 22 to perform one or more of the methods and processes described in more detail below.

In one example, the mixed reality accommodation system 10 may include a mixed reality display program 34 that may be stored in mass storage 18 of the computing device 22. The mixed reality display program 34 may generate a virtual environment 38 for display on a display device, such as the head-mounted display (HMD) device 42, to create a mixed reality environment 40. The virtual environment 38 may include one or more virtual object representations, such as a holographic object 44. In some examples, the virtual environment 38 may be generated to provide a mixed reality experience within the mixed reality environment 40 in the form of an interactive video game, motion picture experience, advertisement, commercial, or other suitable experience.

In another example, the mixed reality display program 34 and/or the mixed reality safety program 14 may be stored remotely and may be accessed by the computing device 22 over a network to which the computing device is operatively connected, such as network 46.

The computing device 22 may take the form of a desktop computing device, a mobile computing device such as a smart phone, laptop, notebook or tablet computer, network computer, home entertainment computer, interactive television, gaming system, or other suitable type of computing device. Additional details regarding the components and computing aspects of the computing device 22 are described in more detail below with reference to FIG. 5.

The computing device 22 may be operatively connected with the HMD device 42 using a wired connection, or may employ a wireless connection via WiFi, Bluetooth, or any other suitable wireless communication protocol. Additionally, the example illustrated in FIG. 1 shows the computing device 22 as a separate component from the HMD device 42. It will be appreciated that in other examples the computing device 22 may be integrated into the HMD device 42.

The computing device 22 also may be operatively connected with one or more additional devices via network 46. Network 46 may take the form of a local area network (LAN), wide area network (WAN), wired network, wireless network, personal area network, or a combination thereof, and may include the Internet.

Figure 2:
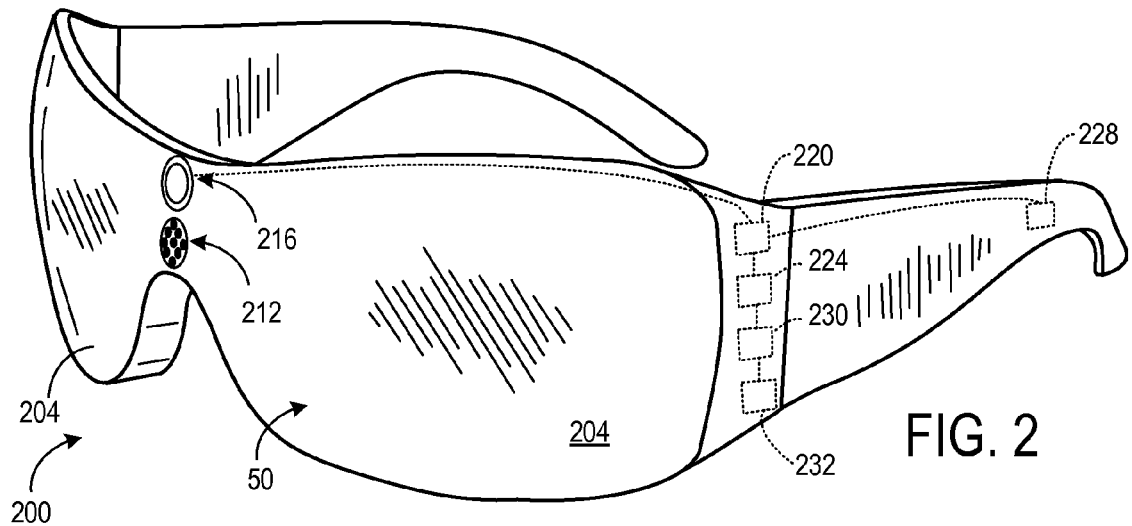
FIG. 2 shows an example head-mounted display device according to an embodiment of the present disclosure.

With reference now also to FIG. 2, one example of an HMD device 200 in the form of a pair of wearable glasses with a transparent display 50 is provided. It will be appreciated that in other examples, the HMD device 200 may take other suitable forms in which a transparent, semi-transparent or non-transparent display is supported in front of a viewer's eye or eyes. It will also be appreciated that the HMD device 42 shown in FIG. 1 may take the form of the HMD device 200, as described in more detail below, or any other suitable HMD device. Additionally, many other types and configurations of display devices having various form factors may also be used within the scope of the present disclosure.

With reference to FIGS. 1 and 2, in this example the HMD device 42 includes a display system 48 and transparent display 50 that enables images to be delivered to the eyes of a user. The transparent display 50 may be configured to visually augment an appearance of a physical environment 52 to a user viewing the physical environment through the transparent display. For example, the appearance of the physical environment may be augmented by graphical content (e.g., one or more pixels each having a respective color and brightness) that is presented via the transparent display 50 to create a mixed reality environment 40.

The transparent display 50 may also be configured to enable a user to view a physical, real-world object in the physical environment 52 through one or more partially transparent pixels that are displaying a virtual object representation. In one example, the transparent display 50 may include image-producing elements located within lenses 204 (such as, for example, a see-through Organic Light-Emitting Diode (OLED) display). As another example, the transparent display 50 may include a light modulator on an edge of the lenses 204. In this example, the lenses 204 may serve as a light guide for delivering light from the light modulator to the eyes of a user. Such a light guide may enable a user to perceive a 3D virtual image located within the physical environment that the user is viewing, while also allowing the user to view physical objects in the physical environment.

In other examples, transparent display 50 may support selective filtering of light received from the physical environment before reaching an eye of a user wearing the HMD device 200. Such filtering may be performed on a pixel-by-pixel basis or on groups of pixels. In one example, transparent display 50 may include a first display layer that adds light in the form of one or more illuminated pixels, and a second display layer that filters ambient light received from the physical environment. These layers may have different display resolution, pixel density, and/or display capabilities.

In some examples, the second display layer may include one or more opacity layers in which blocking images may be generated. The one or more opacity layers may be integrally formed within the transparent display 50. In other examples, the one or more opacity layers may be separately mounted or attached adjacent to the transparent display 50, such as in the form of a separate visor.

The HMD device 42 may also include various systems and sensors. For example, the HMD device 42 may include an eye-tracking sensor system 54 that utilizes at least one inward facing sensor 212 (see FIG. 2). The inward facing sensor 212 may be an image sensor that is configured to acquire image data in the form of eye-tracking information from a user's eyes. Provided the user has consented to the acquisition and use of this information, the eye-tracking sensor system 54 may use this information to track a pupillary response, position and/or movement of the user's eyes. The eye-tracking sensor system 54 may then determine where and/or at what physical object or virtual object the user is gazing.

The HMD device 42 may also include an optical sensor system 58 that utilizes at least one outward facing sensor 216, such as an optical sensor. Outward facing sensor 216 may detect movements within its field of view, such as gesture-based inputs or other movements performed by a user or by a person or physical object within the field of view. Outward facing sensor 216 may also capture image information and depth information from a physical environment and physical objects within the environment. For example, outward facing sensor 216 may include a depth camera, a visible light camera, an infrared light camera, and/or a position tracking camera. In some examples, outward facing sensor 216 may include one or more optical sensors for observing visible spectrum and/or infrared light from real-world lighting conditions in the physical environment. Such sensors may include, for example, a charge coupled device image sensor.

As noted above, the HMD device 42 may include depth sensing via one or more depth cameras. Each depth camera may include left and right cameras of a stereoscopic vision system, for example. Time-resolved images from one or more of these depth cameras may be registered to each other and/or to images from another optical sensor such as a visible spectrum camera, and may be combined to yield depth-resolved video.

In some examples, a depth camera may take the form of a structured light depth camera configured to project a structured infrared illumination comprising numerous, discrete features (e.g., lines or points). The depth camera may be configured to image the structured illumination reflected from a scene onto which the structured illumination is projected. A depth map of the scene may be constructed based on spacings between adjacent features in the various regions of an imaged scene.

In other examples, a depth camera may take the form of a time-of-flight depth camera configured to project a pulsed infrared illumination onto a scene. This depth camera may be configured to detect the pulsed illumination reflected from the scene. Two or more of these depth cameras may include electronic shutters synchronized to the pulsed illumination. The integration times for the two or more depth cameras may differ, such that a pixel-resolved time-of-flight of the pulsed illumination, from the source to the scene and then to the depth cameras, is discernable from the relative amounts of light received in corresponding pixels of the two depth cameras. The HMD device 42 may also include an infrared projector to assist in structured light and/or time of flight depth analysis.

In other examples, gesture-based and other motion inputs from the user and/or persons in the physical environment may also be detected via one or more depth cameras. For example, outward facing sensor 216 may include two or more optical sensors with known relative positions for creating depth images. Using motion results from these optical sensors with known relative positions, such depth images may be generated and mapped to gesture-based and other motion inputs.

Outward facing sensor 216 may capture images of a physical environment 52 in which the user is situated. As discussed in more detail below, such images may be part of physical environment data 70 that may be received by the HMD device 42 and provided to the computing device 22. In one example, the mixed reality display program 34 may include a 3D modeling system that uses such input to generate virtual environment 38 that models the physical environment data 70 that is captured.

The HMD device 42 may also include a position sensor system 62 that utilizes one or more motion sensors 224 to enable position tracking and/or orientation sensing of the HMD device, and determine a position of the HMD device within a physical environment. For example, the position sensor system 62 may be utilized to determine a head pose orientation of a user's head. In one example, position sensor system 62 may comprise an inertial measurement unit configured as a six-axis or six-degree of freedom position sensor system. This example position sensor system may, for example, include three accelerometers and three gyroscopes to indicate or measure a change in location of the HMD device 42 within three-dimensional space along three orthogonal axes (e.g., x, y, z), and a change in an orientation of the HMD device about the three orthogonal axes (e.g., roll, pitch, yaw).

Position sensor system 62 may support other suitable positioning techniques, such as GPS or other global navigation systems. For example, position sensor system 62 may include a wireless receiver (e.g., a GPS receiver or cellular receiver) to receive wireless signals broadcast from satellites and/or terrestrial base stations. These wireless signals may be used to identify a geographic location of the HMD device 42.

Positioning information obtained from wireless signals received by the HMD device 42 may be combined with positioning information obtained from the motion sensors 224 to provide an indication of location and/or orientation of the HMD device 42. While specific examples of position sensor systems have been described, it will be appreciated that other suitable position sensor systems may be used.

Motion sensors 224 may also be employed as user input devices, such that a user may interact with the HMD device 42 via gestures of the neck and head, or even of the body. Non-limiting examples of motion sensors include an accelerometer, a gyroscope, a compass, and an orientation sensor, which may be included as any combination or subcombination thereof.

The HMD device 42 may also include a microphone system 64 that includes one or more microphones 220. In some examples an array of microphones 220 may receive audio input from a user and/or audio input from a physical environment around the user. Additionally or alternatively, one or more microphones separate from the HMD device 42 may be used to receive audio input.

In other examples, audio may be presented to the user via one or more speakers 228 on the HMD device 42. Such audio may include, for example, music, instructions, and/or other communication from the mixed reality display program 34, the mixed reality safety program 14, or other sources.

The HMD device 42 may also include a biometric data sensor system 66 that utilizes one or more sensors 230 to receive and/or detect one or more user biometric parameters from a user of the HMD device. The user biometric parameters may include information related to various physiological processes, functions, measurements, and/or states. The one or more sensors 230 of the biometric data sensor system 66 may include, for example, a heart rate monitor to measure heart rate, a pulse oximeter sensor to measure hemoglobin saturation, an electrodermal response sensor to monitor the skin's electrical resistance, and an electroencephalographic (EEG) monitor to monitor brainwave activity. The user biometric parameters may include, for example, heart rate, pupillary response, hemoglobin saturation, skin conductivity, respiration, perspiration, and brainwave activity. In some examples, a user's pupillary response may be detected by the eye-tracking sensor system 54 of the HMD device 42.

In some examples, and as explained in more detail below, information received by one or more of the above-described sensors and systems may be sent as user action data 68 to the mixed reality safety program 14. Such user action data 68 may be used by the mixed reality safety program 14 to determine a current user action and/or a user intention, which in turn may be used to select safety rules to be applied to the display of the holographic object 44.

The HMD device 42 may also include a processor 232 having a logic subsystem and a storage subsystem, as discussed in more detail below with respect to FIG. 5, that are in communication with the various input and output devices of the HMD device. Briefly, the storage subsystem may include instructions that are executable by the logic subsystem, for example, to receive and forward inputs from the sensors to computing device 22 (in unprocessed or processed form), and to present images to the user via the transparent display 50.

It will be appreciated that the HMD device 42 and related sensors and other components described above and illustrated in FIGS. 1 and 2 are provided by way of example. These examples are not intended to be limiting in any manner, as any other suitable sensors, components, and/or combination of sensors and components may be utilized. Therefore it is to be understood that the HMD device 42 may include additional and/or alternative sensors, cameras, microphones, input devices, output devices, etc. without departing from the scope of this disclosure. Further, the physical configuration of the HMD device 42 and its various sensors and subcomponents may take a variety of different forms without departing from the scope of this disclosure.

Figure 3:
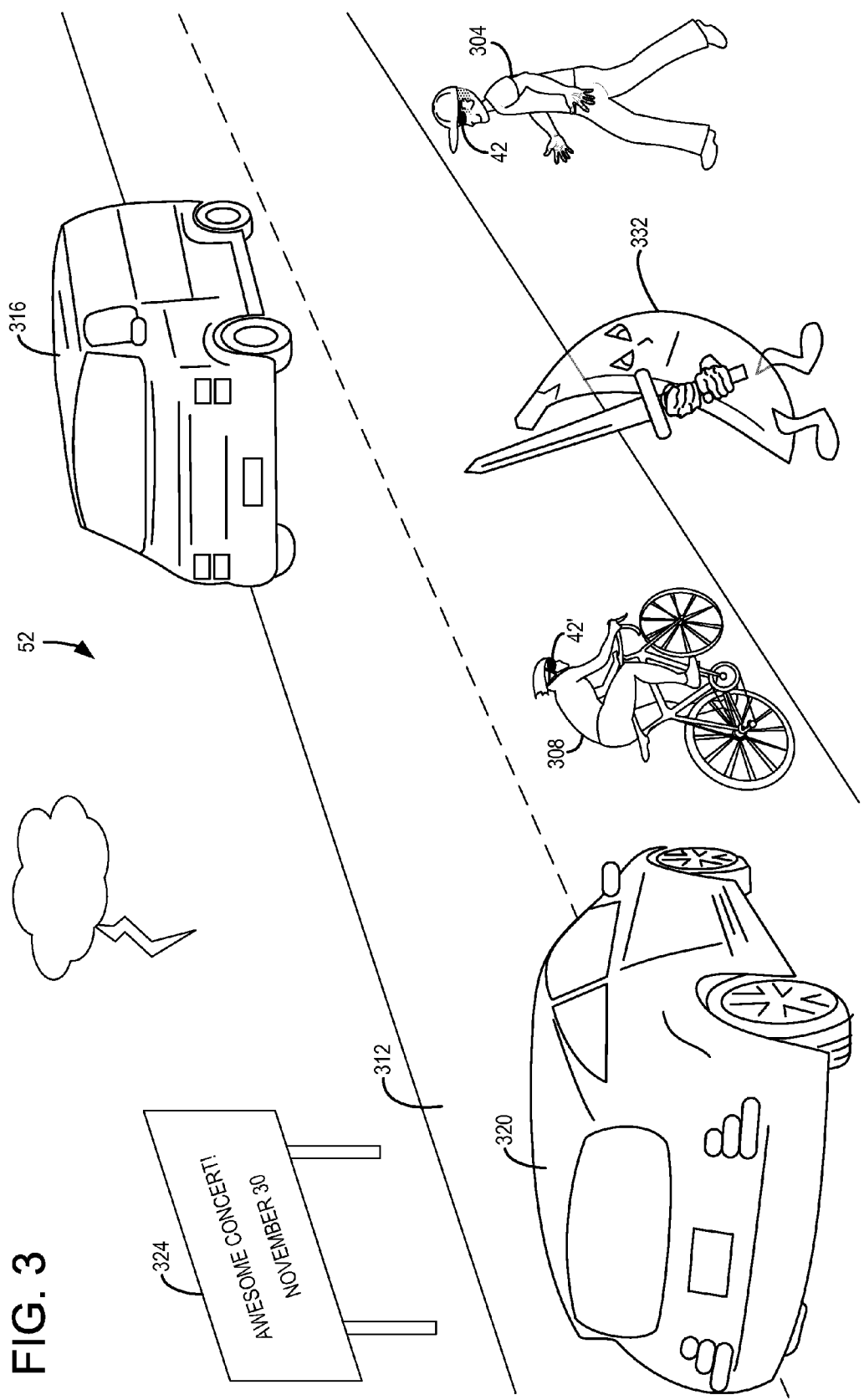
FIG. 3 is a schematic view of an example physical environment including two users wearing the head-mounted display device of FIG. 2 and using the mixed reality accommodation system of FIG. 1.

With reference now also to FIG. 3, descriptions of example use cases and embodiments of the mixed reality accommodation system 10 and HMD device 42 will now be provided. FIG. 3 is a schematic illustration of a first user 304 and a second user 308 located in a physical environment 52. In this example the physical environment 52 includes a street 312 and other physical objects such as cars 316, 320 driving on the street and signs 324 and 328. The first user 304 may wear a first HMD device 42 and the second user 308 may wear a second HMD device 42'. The first HMD device 42 and second HMD device 42' may both take the form of HMD device 200.

As described further in the various use cases discussed below, and with reference again to FIG. 1, the mixed reality safety program 14 may be configured to receive physical environment data 70 from the physical environment 52 via one or more of the sensors and systems described above. The mixed reality safety program 14 is also configured to receive a holographic object 44 from one or more sources, such a server 72 via network 46.

Based on a content provider ID 74 associated with the holographic object 44, the mixed reality safety program 14 may be configured to assign a trust level to the holographic object 44. And based on the assigned trust level, the mixed reality safety program 14 may be configured to apply a set of safety rules that provide a predetermined level of display restrictions for the holographic object 44.

If the trust level is less than a trust level threshold, then a first set of safety rules 78 providing a protective level of display restrictions may be applied. If the trust level is greater than or equal to the trust level threshold, then a second set of safety rules 80 providing a permissive level of display restrictions may be applied, where the protective level of display restrictions is greater than the permissive level of display restrictions. The holographic object 44 may then be displayed via the display system 48 according to the applied set of safety rules.

In one example and with reference now to FIG. 3, the second user 308 may desire to play an interactive mixed reality game with the first user 304. The game may include a holographic object in the form of a large sword-wielding banana 332 against which players do battle. An on-line gaming service may serve the holographic banana 332 from server 72 via network 46 to the computing device 22 of the HMD device 42. The holographic banana 332 may be associated with a content provider ID 74 that identifies the on-line gaming service as the source providing the holographic banana.

With reference again to FIG. 1, the mixed reality safety program 14 may include a trust level selector program 76 that analyzes the content provider ID 74 and assigns a trust level to the holographic banana 332 based on the content provider ID. In one example, the first user 304 may have a trusted relationship with the on-line gaming service that is indicated, for example, by the on-line gaming service being included in a "trusted relationship" list located in a user preferences file 82 within user profile data 84 stored in computing device 22.

The mixed reality safety program 14 may be configured to compare the assigned trust level to a trust level threshold to determine what safety rules among a plurality of safety rules to apply to the display of the holographic banana 332. In one example, the trust level threshold may be defined as whether a trusted relationship exists between the source of the holographic banana 332 and the first user 304. If such a trusted relationship exists, then the trust level is greater than or equal to the trust level threshold. If such a trusted relationship does not exist, then the trust level is less than the trust level threshold.

Alternatively expressed, the trust level threshold may be expressed as having a numerical value of 1. If a trusted relationship exists, then the trust level assigned to the holographic banana 332 is 1. If a trusted relationship does not exist, then the trust level assigned to the holographic banana is 0. In the above example, the assigned trust level of 1 is greater than or equal to the trust level threshold of 1. In another example where a trusted relationship does not exist between the source of the holographic banana 332 and the first user 304, the assigned trust level of 0 is less than the trust level threshold of 1.

In examples where the assigned trust level is less than the trust level threshold, the mixed reality safety program 14 is configured to apply a first set of safety rules 78 that provide a protective level of display restrictions for the holographic banana 332. The first set of safety rules 78 may include one or more safety rules that relate to the manner in which the holographic banana 332 is displayed via the display system 48 of the HMD device 42. In one example, the "display restrictions" provided by the first set of safety rules 78 may be defined as controls related to the display of the holographic banana 332 that restrict the extent to which the holographic banana obscures, impinges upon or otherwise alters the first user's perception of the physical environment 52 as viewed through the HMD device 42.

The protective level of display restrictions associated with the first set of safety rules 78 may be greater than a permissive level of display restrictions associated with a second set of safety rules 80 described in more detail below. In other words, the protective level of display restrictions may restrict the extent to which the holographic banana 332 obscures, impinges upon or otherwise alters the first user's perception of the physical environment 52 to a greater degree than the permissive level of display restrictions.

Returning to the present example, where the first user 304 has a trusted relationship with the on-line gaming service, and therefore the trust level is greater than or equal to the trust level threshold, a display mode generator 86 of the mixed reality safety program 14 may be configured to display the holographic banana 332 via the display system 48 of the HMD device 42 according to the second set of safety rules 80. As noted above, the second set of safety rules 80 may provide a permissive level of display restrictions for the holographic banana. In this manner, the HMD device 42 may display the holographic banana 332 in a manner that alters the first user's perception of the physical environment 52 to a greater degree than would be allowed by the restrictive level of display restrictions associated with the first set of safety rules 78.

In one example, such permissive level of display restrictions may include displaying the holographic banana 332 with significant opacity such that the holographic banana may obscure or block the first user's view of physical objects or other aspects of the physical environment 52. Such permissive level of display restrictions may include displaying the holographic banana 332 in a manner that appears highly realistic to the first user 304, such that the holographic banana strongly attracts the attention of the first user 304.

In other examples, such permissive level of display restrictions may include displaying the holographic banana 332 in a significantly larger size and scale as compared to other physical objects in the physical environment. Such permissive level of display restrictions may further include displaying holographic objects in a manner corresponding to a fanciful appearance and/or behavior, such as the holographic banana 332 wielding a sword and performing sophisticated sword-fighting moves. It will be appreciated that various other examples of a permissive level of display restrictions may be provided within the scope of the present disclosure.

In another example, the first user 304 may not have a trusted relationship with the on-line gaming service, and therefore the trust level is less than the trust level threshold. Accordingly, the display mode generator 86 of the mixed reality safety program 14 may be configured to display the holographic banana 332 via the display system 48 of the HMD device 42 according to the first set of safety rules 78. As noted above, the first set of safety rules 78 may provide a protective level of display restrictions for the holographic banana 332. In this manner, the HMD device 42 may display the holographic banana 332 in a manner that alters the first user's perception of the physical environment 52 to a lesser degree than allowed by the permissive level of display restrictions discussed above.

In one example, such protective level of display restrictions may include displaying the holographic banana 332 with significant transparency such that the holographic banana does not obscure or block the first user's view of physical objects or other aspects of the physical environment 52. Such protective level of display restrictions may also include displaying holographic objects in a manner that appears clearly unrealistic to the first user 304, such as with a distinctive holographic beacon or significant transparency, such that the holographic object may be quickly identified by the first user 304 as a holographic object.

In other examples, such protective level of display restrictions may include displaying the holographic banana 332 in a smaller size and scale as compared to other physical objects in the physical environment, to thereby reduce the visual impact of the holographic banana. Such protective level of display restrictions may further include displaying the holographic banana 332 in a manner corresponding to a normal appearance and/or behavior, such as displaying the holographic banana without the illustrated face, hands and legs. In other examples, such protective level of display restrictions may include not displaying the holographic banana 332. It will be appreciated that various other examples of a protective level of display restrictions may be provided within the scope of the present disclosure.

In another example, the holographic object 44 may include two or more versions that each embodies different safety ratings that correspond to different levels of display restrictions for the holographic object. For example, a first holographic object version 88 may include a protective safety rating and a second version 90 may include a permissive safety rating that is different from the protective safety rating. The protective safety rating may correspond to a protective level of display restrictions as described above. Similarly, the permissive safety rating may correspond to a permissive level of display restrictions as described above. In this manner, and depending upon the assigned trust level, the mixed reality safety program 14 may select the first version 88 or the second version 90 of the holographic object 44, and display the holographic object according to the corresponding display restrictions.

In the above examples, two sets of safety rules corresponding to two levels of display restrictions are used. It will also be appreciated that any other suitable number of sets of safety rules and corresponding levels of display restrictions, such as 3, 4, 5, 6, 10, 100, or other number, may be utilized within the scope of the present disclosure. Additionally, any suitable variation and/or combination of different display restrictions may be utilized within a particular level of display restrictions.

It will also be appreciated that various other types and measures of trust levels and related trust level thresholds may be utilized within the scope of the present disclosure. For example, a trust level may be associated with a frequency of interaction between the first user 304 and the source of holographic object 44. In one example, the more frequently the first user 304 has interacted with the source, the higher the trust level associated with that source. In another example, a trust level may be associated with an affirmatively selected user preference 82 that denotes a source as a trusted source. In another example, a trust level may be inferred using input from a social graph of the first user 304, a contacts list, email activity, messaging activity and/or other communication activity of the first user 304, provided that the first user has provided appropriate consent for use of such information.

In another example, the content provider ID 74 may identify a developer or author of the holographic object 44, which may be the same or a different person or entity as the person or entity that distributes the holographic object 44. For example, the holographic object 44 may be served from the server 72 via network 46 to the computing device 22 of the HMD device 42. The holographic object 44 may be associated with a content provider ID 74 that identifies the second user 308 as the developer of the object. The trust level selector program 76 may then assign a trust level to the holographic object 44 based on the second user 308 being identified as the developer of the object.

In other examples, one or more additional criteria may be used to select and apply a set of safety rules that provide a predetermined level of display restrictions for a holographic object. In one example, physical environment data 70 may also be used to select and apply a set of safety rules. The physical environment data 70 may include, but are not limited to, one or more environmental conditions 92, a user location 94, and one or more location-based restrictions 96. The one or more environmental conditions 92 may include, but are not limited to, a date, a time of day, a weather condition, an ambient light level, and an ambient noise level.

In one example, the first user 304 may be traveling on vacation from May 1-8. From May 1-8, the first user 304 may desire to prohibit the display of holographic objects received from sources associated with a trust level less than a trust level threshold of 5 on a scale of 1-5. Accordingly, from May 1-8, the mixed reality safety program 14 may apply a first set of safety rules 78 that provide a protective level of display restrictions to holographic objects associated with a trust level less than 5, where the protective level of display restrictions corresponds to not displaying such holographic objects.

In another example, the second user 308 may typically commute to work by bicycle each weekday morning between 7:00-7:45 am. Accordingly, between 7:00-7:45 am each weekday morning, the mixed reality safety program 14 may apply a set of safety rules that provide a more protective level of display restrictions to holographic objects as compared to a more permissive set of safety rules applied to holographic objects during times other than between 7:00-7:45 am each weekday morning.

In another example and with reference again to FIG. 3, the first user 304 may be outside during inclement weather, such as a thunderstorm with wind, lightning and driving rain. Such weather may be detected by the HMD device 42 by, for example, image information captured by the outward facing sensor 216. Based on detecting such inclement weather, the mixed reality safety program 14 may apply a set of safety rules that provide a more protective level of display restrictions to holographic objects, as compared to a more permissive set of safety rules applied to holographic objects when inclement weather is not present.

In another example, the first user may be walking along the street 312 at night when the ambient light level is low and below, for example, a daylight threshold. Such ambient light level may be detected by the HMD device 42 by, for example, ambient light information captured by the outward facing sensor 216. Based on an ambient light level below a daylight threshold, the mixed reality safety program 14 may apply a set of safety rules that provide a more protective level of display restrictions to holographic objects, as compared to a more permissive set of safety rules applied to holographic objects when the ambient light level is above such threshold.

In another example, the first user may be walking along a busy street 312 where noise from passing cars 316, 320 combined with other ambient noise creates an ambient noise level that is above, for example, an ambient noise threshold. Such ambient noise level may be detected by the HMD device 42 by, for example, audio information captured by the microphone system 64. Based on an ambient noise level above an ambient noise threshold, the mixed reality safety program 14 may apply a set of safety rules that provide a more protective level of display restrictions to holographic objects, as compared to a more permissive set of safety rules applied to holographic objects when the ambient noise level is above such threshold.

As noted above, in some examples the physical environment data 70 may include a user location 94. In one example and with reference to FIG. 3, the second user 308 may be riding a bicycle along the side of the street 312. The location of the second user 308 next to the busy street 312 may be determined by, for example, the position sensor system 62 of the HMD device 42'. Based on the location of the second user 308 close to the busy street 312, the mixed reality safety program 14 may apply a set of safety rules that provide a more protective level of display restrictions to holographic objects, as compared to a more permissive set of safety rules applied to holographic objects when the second user is riding a bicycle along a bike path beside a beach.

Also as noted above, the physical environment data 70 may include one or more location-based restrictions 96. In some examples, the one or more location-based restrictions 96 may include government-based restrictions and private entity-based restrictions. In one example, the first user 304 may be walking along street 312 within a government military base. For security reasons, the government may impose restrictions on the display of holographic objects by HMD devices used within the boundaries of the military base. The computing device 22 may receive the display restrictions from the government. Accordingly, while the first user 304 is on the military base, the mixed reality safety program 14 may apply a set of government-based restrictions that add additional display restrictions to holographic objects displayed by the HMD device 42.

In another example, the first user 304 may enter a bank to make a deposit. For security reasons, the bank may impose restrictions on the display of holographic objects by HMD devices used within the bank. The computing device 22 may receive the display restrictions from the bank. Accordingly, while the first user 304 is in the bank, the mixed reality safety program 14 may apply a set of bank-based restrictions that add additional display restrictions to holographic objects displayed by the HMD device 42.

It will also be appreciated that in other examples, various physical environment data 70 may be used to select and apply a set of safety rules that provide a more permissive level of display restrictions to holographic objects, as compared to a more protective set of safety rules applied based on such physical environment data. Further, in some examples two or more different instances of physical environment data 70 may be used to select and apply a set of safety rules.

In other examples, user action data 68 may also be used to select and apply a set of safety rules. The user action data 68 may include, but are not limited to, eye-tracking information, microphone information, optical sensor information, position sensor information, and biometric information. Using the user action data 68, the mixed reality safety program 14 may determine a current user action by using, for example, one or more of heuristics, an action-inference table, and programmatic rules. The mixed reality safety program 14 may then select and apply a set of safety rules based on the current user action.

In one example and with reference to FIG. 3, the first user 304 may be looking across the street 312 at the billboard 324. Eye-tracking information received from the eye-tracking sensor system 54 of the HMD device 42 may be used by the mixed reality safety program 14 to determine that the first user 304 is gazing at the billboard 324. Utilizing this eye-tracking information and heuristics related to previous behavior of the first user 304, the mixed reality safety program 14 may determine that the attention of the first user 304 is currently substantially focused on the billboard 324. Accordingly, the mixed reality safety program 14 may apply a set of safety rules that provide a more protective level of display restrictions to holographic objects, as compared to a more permissive set of safety rules applied to holographic objects when the first user's attention is not substantially focused on another object. For example, the mixed reality safety program 14 may change the displayed position of the holographic banana 332 from the middle of the street 312 to along the side of the street as shown.

In another example, the first user 304 may be speaking with a business client regarding an important business matter. Audio information received from the microphone system 64 of the HMD device 42 may be used by the mixed reality safety program 14 to determine that the first user 304 is engaged in an important conversation. Utilizing an action-inference table that uses aspects of the first user's conversation to infer that the user is engaged in an important conversation, the mixed reality safety program 14 may determine that the attention of the first user 304 is substantially focused on his conversation with the business client. Accordingly, the mixed reality safety program 14 may apply a set of safety rules that provide a more protective level of display restrictions to holographic objects, such as the holographic banana 332, as compared to a more permissive set of safety rules applied to holographic objects when the first user 304 is not engaged in an important conversation.

In another example, the second user 308 may be riding a bicycle along the street 312. Image data received from the optical sensor system 58 of the HMD device 42 may be used by the mixed reality safety program 14 to determine that the second user 308 is riding the bicycle. Based on determining that the second user 308 is riding a bicycle, the mixed reality safety program 14 may apply a programmatic rule that applies a set of safety rules providing a more protective level of display restrictions to holographic objects, such as the holographic banana 332, while the user is riding a bicycle. For example, such a programmatic rule may prohibit the display of holographic objects regardless of the trust level assigned to the object.

In another example, the first user 304 may be walking toward and approaching the street 312. Position data received from the position sensor system 62 of the HMD device 42 may be used by the mixed reality safety program 14 to determine that the first user 304 is moving toward and approaching the street 312. Based on determining that the first user 304 is moving toward and approaching the street 312, the mixed reality safety program 14 may apply a set of safety rules providing a more protective level of display restrictions to holographic objects, such as the holographic banana 332. Such restrictions may include, for example, allowing the display of holographic objects only in a user field of view above the street 312.

In another example, the first user 304 may be walking to a job interview. The first user 304 may be nervous about the interview and may be experiencing a corresponding stress response. Biometric information received from the biometric sensor system 66 of the HMD device 42, such as the heart rate of the first user 304, may be used by the mixed reality safety program 14 to determine that the first user 304 is experiencing a stress response. Based on determining that the first user 304 is experiencing a stress response, the mixed reality safety program 14 may apply a set of safety rules providing a more protective level of display restrictions to holographic objects, such as the holographic banana 332.

It will also be appreciated that various other types of biometric information may be detected by the biometric sensor system 66 and used by the mixed reality safety program 14 to determine that a user is experiencing various other biologic responses. Such other types of biometric information may include information related to various physiological processes, functions, measurements, and/or states. Such biometric information may also be used to select and apply a set of safety rules.

In other examples, the mixed reality safety program 14 may also utilize the user action data 68 to determine a user intention using, for example, one or more of heuristics, an action-inference table, and programmatic rules. The mixed reality safety program 14 may then select and apply a set of safety rules based also on the determined user intention.

In one example, a user may be playing a mixed reality chase game inside the user's home. The game involves the user and a holographic dog both chasing and trying to catch a holographic squirrel. The holographic squirrel may scamper through a plate glass window. Position sensor information from the position sensor system 62 may show that the user is moving toward the plate glass window. Given this position information and the objective of the game, the mixed reality safety program 14 may determine that the user intends to follow the holographic squirrel through the plate glass window, which the user may not see. Accordingly, the mixed reality safety program 14 may apply a set of safety rules that provide a more protective level of display restrictions to the holographic squirrel, such as changing the holographic squirrel into an urgent holographic message warning the user to stop moving toward the plate glass window.

It will also be appreciated that in other examples, one or more current user actions and one or more user intentions may be utilized by the mixed reality safety program to select and apply a set of safety rules that provide display restrictions for a holographic object.

As illustrated by the above example use cases, the mixed reality accommodation system 10 may selectively adjust the display of a holographic object to manage a user's perception of the object, including changing a position of the object, how the object is perceived relative to physical objects in the physical environment, and how the object interacts with other holographic objects. Advantageously, by managing the display of holographic objects to accommodate a mixed reality environment in this manner, the mixed reality accommodation system 10 may provide a more enjoyable and satisfying mixed reality experience.

Figure 4A:
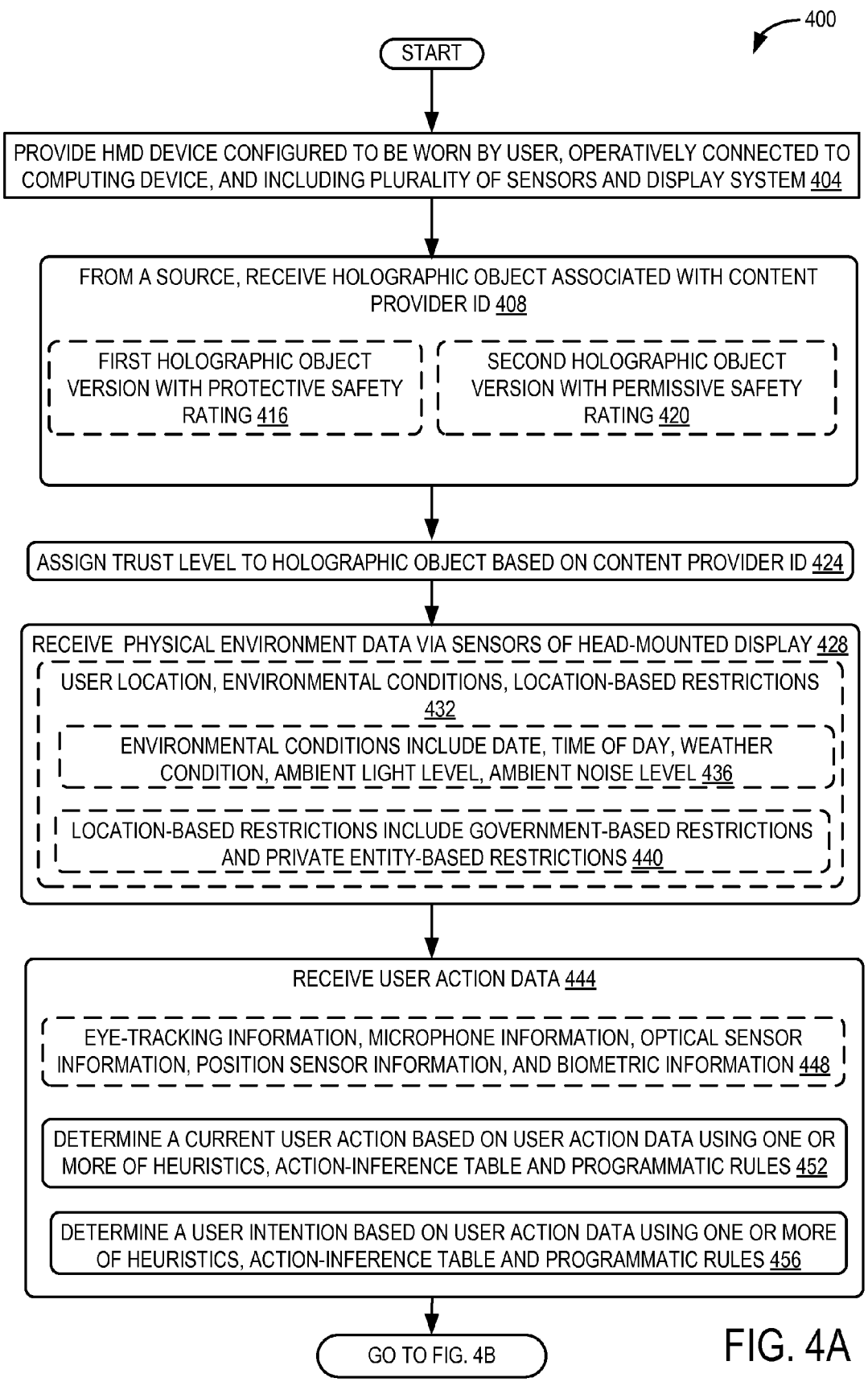
FIGS. 4A, 4B and 4C are a flow chart of a method for displaying a holographic object according to an embodiment of the present disclosure.
Figure 4B:
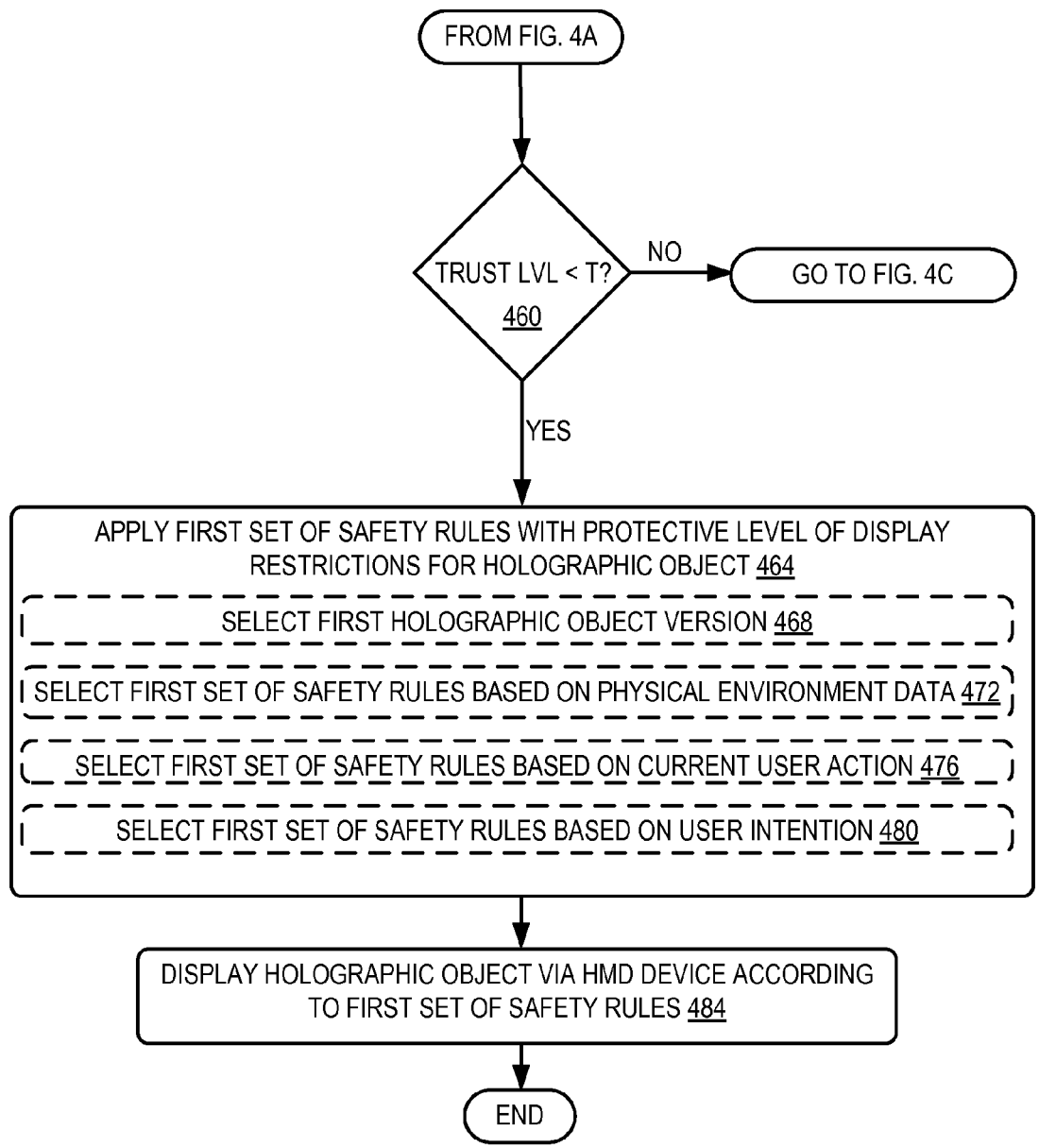
Figure 4C:
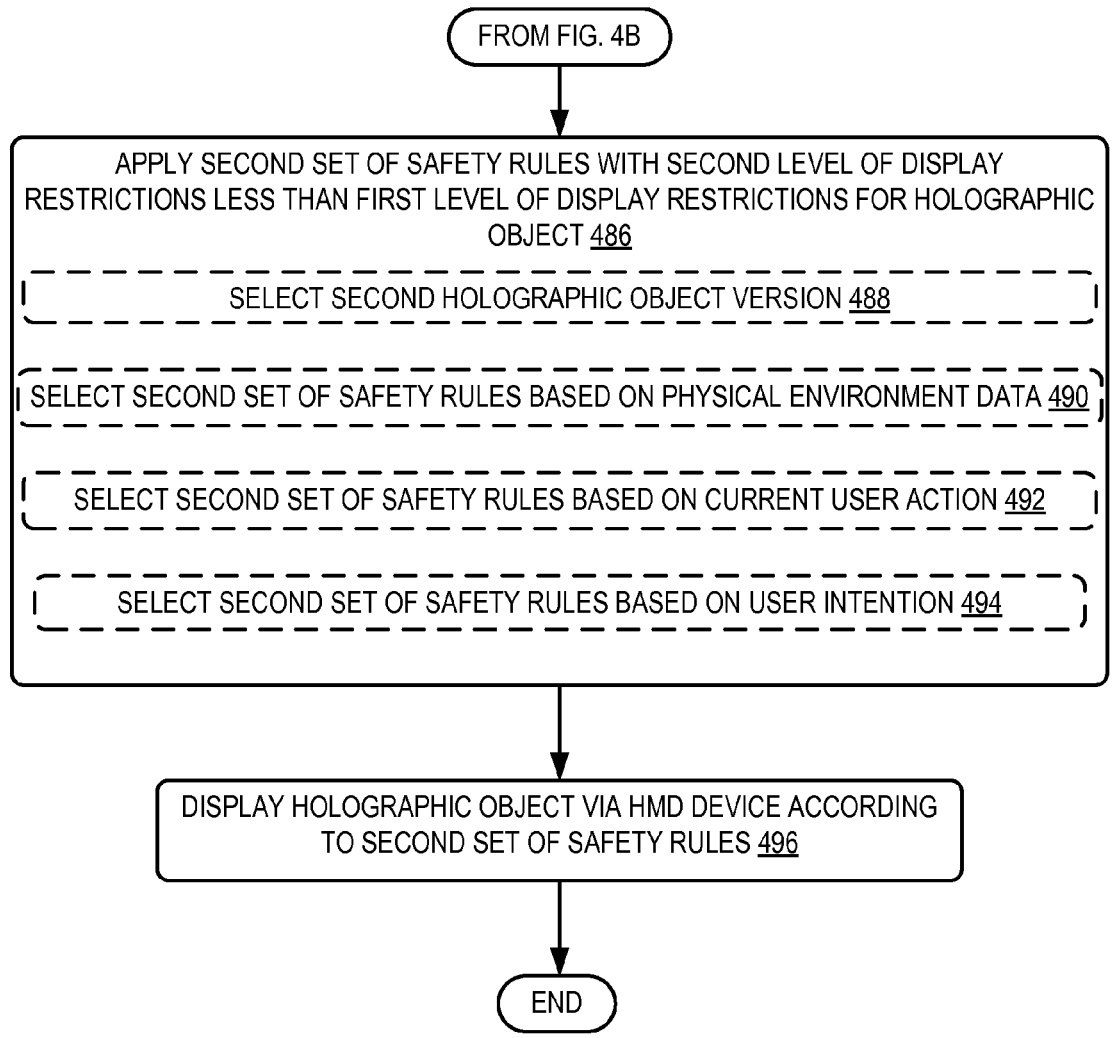

FIGS. 4A, 4B and 4C illustrate a flow chart of a method 400 for displaying a holographic object to accommodate a mixed reality environment including a physical environment according to an embodiment of the present disclosure. The following description of method 400 is provided with reference to the software and hardware components of the mixed reality accommodation system 10 described above and shown in FIGS. 1-3. It will be appreciated that method 400 may also be performed in other contexts using other suitable hardware and software components.

With reference to FIG. 4A, at 404 the method 400 includes providing an HMD device 42 that is configured to be worn by a user and operatively connected to a computing device 22. The HMD device 42 includes a plurality of sensors and a display system 48 for presenting holographic objects. At 408 the method 400 includes receiving a holographic object 44 from a source, the holographic object 44 being associated with a content provider ID 74.

As indicated at 416, the holographic object 44 may comprise a first holographic object version having a protective safety rating. As indicated at 420, the holographic object 44 may further comprise a second holographic object version having a permissive safety rating. At 424 the method 400 includes assigning a trust level to the holographic object 44 based on the content provider ID 74. At 428 the method 400 includes receiving physical environment data from the physical environment via one or more of the sensors of the HMD device 42.

As indicated at 432, the physical environment data may comprise one or more environmental conditions, a user location, and one or more location-based restrictions. As indicated at 436, the one or more environmental conditions may comprise a date, a time of day, a weather condition, an ambient light level, and an ambient noise level. As indicated at 440, the one or more location-based restrictions may comprise government-based restrictions and private entity-based restrictions.

At 444 the method 400 includes receiving user action data. As indicated at 448, the user action data includes eye-tracking information, microphone information, optical sensor information, position sensor information, and biometric information. At 452 the method 400 includes determining a current user action based on the user action data. In one example, the current user action may be determined using one or more of heuristics, an action-inference table, and programmatic rules. At 456 the method 400 includes determining a user intention based on the user action data. In one example, the user intention may be determined using one or more of heuristics, an action-inference table, and programmatic rules.

With reference now to FIG. 4B, at 460 the method 400 includes determining whether the trust level assigned to the holographic object is less than a trust level threshold T. If the trust level assigned to the holographic object is less than the trust level threshold T, then at 464 the method 400 includes applying a first set of safety rules that provide a protective level of display restrictions for the holographic object.

At 468 the method 400 may include selecting the first hologram version that includes a protective safety rating. At 472 the method 400 may include selecting the first set of safety rules based on the physical environment data. At 476 the method 400 may include selecting the first set of safety rules based on the current user action. At 480 the method 400 may include selecting the first set of safety rules based on the user intention. At 484 the method 400 includes displaying the holographic object via the HMD device 42 according to the first set of safety rules. The method 400 may then end.

Returning to 460, if the trust level assigned to the holographic object is greater than or equal to the trust level threshold T, then at 486 (see FIG. 4C) the method 400 includes applying a second set of safety rules that provide a permissive level of display restrictions that are less than the protective level of display restrictions for the holographic object. At 488 the method 400 may include selecting the second hologram version that includes a permissive safety rating. At 490 the method 400 may include selecting the second set of safety rules based on the physical environment data. At 492 the method 400 may include selecting the second set of safety rules based on the current user action. At 494 the method 400 may include selecting the second set of safety rules based on the user intention. At 496 the method 400 may then include displaying the holographic object via the HMD device 42 according to the second set of safety rules. The method 400 may then end.

It will be appreciated that method 400 is provided by way of example and is not meant to be limiting. Therefore, it is to be understood that method 400 may include additional and/or alternative steps than those illustrated in FIGS. 4A, 4B and 4C. Further, it is to be understood that method 400 may be performed in any suitable order. Further still, it is to be understood that one or more steps may be omitted from method 400 without departing from the scope of this disclosure.

Figure 5:
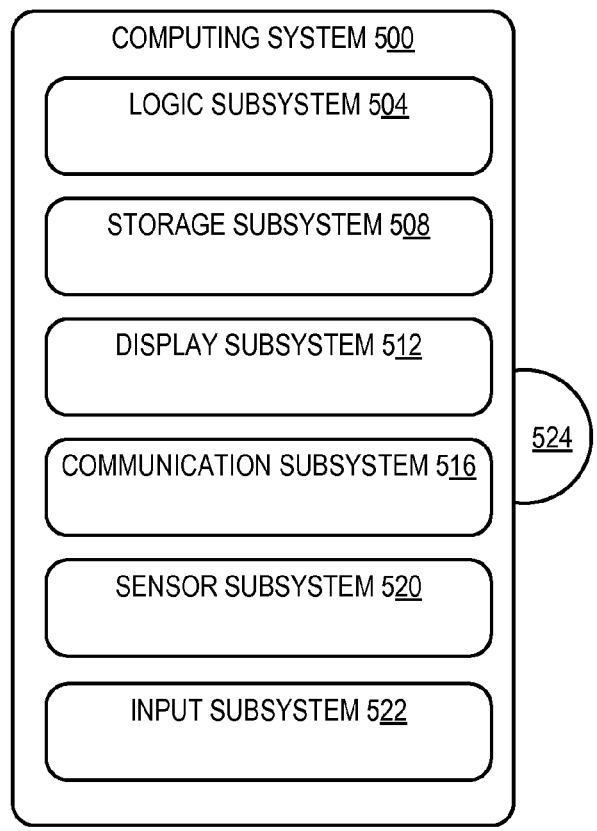
FIG. 5 is a simplified schematic illustration of an embodiment of a computing system.

FIG. 5 schematically shows a nonlimiting embodiment of a computing system 500 that may perform one or more of the above described methods and processes. Computing device 22 may take the form of computing system 500. Computing system 500 is shown in simplified form. It is to be understood that virtually any computer architecture may be used without departing from the scope of this disclosure. In different embodiments, computing system 500 may take the form of a mainframe computer, server computer, desktop computer, laptop computer, tablet computer, home entertainment computer, network computing device, mobile computing device, mobile communication device, gaming device, etc. As noted above, in some examples the computing system 500 may be integrated into an HMD device.

As shown in FIG. 5, computing system 500 includes a logic subsystem 504 and a storage subsystem 508. Computing system 500 may optionally include a display subsystem 512, a communication subsystem 516, a sensor subsystem 520, an input subsystem 522 and/or other subsystems and components not shown in FIG. 5. Computing system 500 may also include computer readable media, with the computer readable media including computer readable storage media and computer readable communication media. Computing system 500 may also optionally include other user input devices such as keyboards, mice, game controllers, and/or touch screens, for example. Further, in some embodiments the methods and processes described herein may be implemented as a computer application, computer service, computer API, computer library, and/or other computer program product in a computing system that includes one or more computers.

Logic subsystem 504 may include one or more physical devices configured to execute one or more instructions. For example, the logic subsystem 504 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem 504 may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Storage subsystem 508 may include one or more physical, persistent devices configured to hold data and/or instructions executable by the logic subsystem 504 to implement the herein described methods and processes. When such methods and processes are implemented, the state of storage subsystem 508 may be transformed (e.g., to hold different data).

Storage subsystem 508 may include removable media and/or built-in devices. Storage subsystem 508 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Storage subsystem 508 may include devices with one or more of the following characteristics: volatile, nonvolatile, dynamic, static, read/write, read-only, random access, sequential access, location addressable, file addressable, and content addressable.

In some embodiments, aspects of logic subsystem 504 and storage subsystem 508 may be integrated into one or more common devices through which the functionally described herein may be enacted, at least in part. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

FIG. 5 also shows an aspect of the storage subsystem 508 in the form of removable computer readable storage media 524, which may be used to store data and/or instructions executable to implement the methods and processes described herein. Removable computer-readable storage media 524 may take the form of CDs, DVDs, HD-DVDs, Blu-Ray Discs, EEPROMs, and/or floppy disks, among others.

It is to be appreciated that storage subsystem 508 includes one or more physical, persistent devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal via computer-readable communication media.

When included, display subsystem 512 may be used to present a visual representation of data held by storage subsystem 508. As the above described methods and processes change the data held by the storage subsystem 508, and thus transform the state of the storage subsystem, the state of the display subsystem 512 may likewise be transformed to visually represent changes in the underlying data. The display subsystem 512 may include one or more display devices utilizing virtually any type of technology. Such display devices may be combined with logic subsystem 504 and/or storage subsystem 508 in a shared enclosure, or such display devices may be peripheral display devices. The display subsystem 512 may include, for example, the display system 48 and transparent display 50 of the HMD device 42.

When included, communication subsystem 516 may be configured to communicatively couple computing system 500 with one or more networks and/or one or more other computing devices. Communication subsystem 516 may include wired and/or wireless communication devices compatible with one or more different communication protocols. As nonlimiting examples, the communication subsystem 516 may be configured for communication via a wireless telephone network, a wireless local area network, a wired local area network, a wireless wide area network, a wired wide area network, etc. In some embodiments, the communication subsystem may allow computing system 500 to send and/or receive messages to and/or from other devices via a network such as the Internet.

Sensor subsystem 520 may include one or more sensors configured to sense different physical phenomenon (e.g., visible light, infrared light, sound, acceleration, orientation, position, etc.) and/or physiological processes, functions, measurements, and/or states as described above. For example, the sensor subsystem 520 may comprise one or more eye-tracking sensors, image sensors, microphones, motion sensors such as accelerometers, compasses, touch pads, touch screens, heart rate monitors, pulse oximeters, electrodermal response sensors, electroencephalographic (EEG) monitors, and/or any other suitable sensors.

Sensor subsystem 520 may be configured to provide physical environment data 70 and/or user action data 68 to logic subsystem 504, for example. As described above, such data may include biometric information, eye-tracking information, image information, audio information, ambient lighting information, depth information, position information, motion information, environmental condition information, user location information, location-based restriction information, and/or any other suitable sensor data that may be used to perform the methods and processes described above.

In some embodiments sensor subsystem 520 may include a depth camera (e.g., outward facing sensor 216 of FIG. 2). The depth camera may include left and right cameras of a stereoscopic vision system, for example. Time-resolved images from both cameras may be registered to each other and combined to yield depth-resolved video. In other embodiments the depth camera may be a structured light depth camera or a time-of-flight camera, as described above In some embodiments, sensor subsystem 520 may include a visible light camera, such as a digital camera. Virtually any type of digital camera technology may be used without departing from the scope of this disclosure. As a non-limiting example, the visible light camera may include a charge coupled device image sensor.

When included, input subsystem 522 may comprise or interface with one or more sensors or user-input devices such as a game controller, gesture input detection device, voice recognizer, inertial measurement unit, keyboard, mouse, or touch screen. In some embodiments, the input subsystem 522 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

The term "program" may be used to describe an aspect of the mixed reality accommodation system 10 that is implemented to perform one or more particular functions. In some cases, such a program may be instantiated via logic subsystem 504 executing instructions held by storage subsystem 508. It is to be understood that different programs may be instantiated from the same application, service, code block, object, library, routine, API, function, etc. Likewise, the same program may be instantiated by different applications, services, code blocks, objects, routines, APIs, functions, etc. The term "program" is meant to encompass individual or groups of executable files, data files, libraries, drivers, scripts, database records, etc.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for displaying a holographic object to accommodate a mixed reality environment including a physical environment, comprising:
   providing a head-mounted display device configured to be worn by a user and operatively connected to a computing device, the head-mounted display device including a plurality of sensors and a display system;
   receiving physical environment data from the physical environment via one or more of the sensors;
   receiving the holographic object from a source, the holographic object associated with a content provider ID that identifies the source;
   assigning a trust level to the holographic object based on the content provider ID that identifies the source;
   if the trust level is less than a trust level threshold, then:
   selecting a first set of safety rules based on the physical environment data, the safety rules providing different levels of display restrictions for the holographic object, and applying the first set of safety rules that provide a protective level of display restrictions for the holographic object; and
   displaying the holographic object with a first level of realism via the display system according to the first set of safety rules;
   if the trust level is greater than or equal to the trust level threshold, then:
   selecting a second set of safety rules based on the physical environment data and applying the second set of safety rules that provide a permissive level of display restrictions for the holographic object; and
   displaying the holographic object with a second level of realism greater than the first level of realism via the display system according to the second set of safety rules, wherein the first level of realism is a first blur amount of the object and the second level of realism is a second blur amount of the object.

2. The method of claim 1, wherein the physical environment data is selected from the group consisting of one or more environmental conditions, a user location, and one or more location-based restrictions.

3. The method of claim 2, wherein the one or more environmental conditions are selected from the group consisting of a date, a time of day, a weather condition, an ambient light level, and an ambient noise level.

4. The method of claim 2, wherein the one or more location-based restrictions are selected from the group consisting of government-based restrictions and private entity-based restrictions.

5. The method of claim 1, further comprising:
receiving user action data that is selected from the group consisting of eye-tracking information, microphone information, optical sensor information, position sensor information, and biometric information; and
determining a current user action based on the user action data using one or more of heuristics, an action-inference table, and programmatic rules.

6. The method of claim 5, wherein applying the first set of safety rules further comprises selecting the first set of safety rules based on the current user action, and
applying the second set of safety rules further comprises selecting the second set of safety rules based on the current user action.

7. The method of claim 5, further comprising determining a user intention based on the user action data and using one or more of heuristics, an action-inference table, and programmatic rules, and wherein applying the first set of safety rules further comprises selecting the first set of safety rules based also on the user intention, and applying the second set of safety rules further comprises selecting the second set of safety rules based also on the user intention.

8. The method of claim 1, wherein the holographic object comprises a first holographic object version that includes a protective safety rating and a second holographic object version that includes a permissive safety rating different from the protective safety rating.

9. The method of claim 8, wherein applying the first set of safety rules further comprises selecting the first holographic object version, and applying the second set of safety rules further comprises selecting the second holographic object version.

10. A mixed reality accommodation system, comprising:
a head-mounted display device configured to be worn by a user and operatively connected to a computing device, the head-mounted display device including a plurality of sensors and a display system for presenting holographic objects, and
a mixed reality safety program executed by a processor of the computing device, the mixed reality safety program configured to:
receive physical environment data from a physical environment via one or more of the sensors;
receive a holographic object from a source, the holographic object associated with a content provider ID that identifies the source;
assign a trust level to the holographic object based on the content provider ID that identifies the source;
if the trust level is less than a trust level threshold, then:
select a first set of safety rules based on the physical environment data, wherein the safety rules provide different levels of display restrictions for the holographic object, and apply the first set of safety rules that provide a protective level of display restrictions for the holographic object; and
display the holographic object with a first level of realism via the display system according to the first set of safety rules;
if the trust level is greater than or equal to the trust level threshold, then:
select a second set of safety rules based on the physical environment data and apply the second set of safety rules that provide a permissive level of display restrictions for the holographic object; and
display the holographic object with a second level of realism greater than the first level of realism via the display system according to the second set of safety rules, wherein the first level of realism is a first blur amount of the object and the second level of realism is a second blur amount of the object.

11. The mixed reality accommodation system of claim 10, wherein the physical environment data is selected from the group consisting of one or more environmental conditions, a user location, and one or more location-based restrictions.

12. The mixed reality accommodation system of claim 11, wherein the one or more environmental conditions are selected from the group consisting of a date, a time of day, a weather condition, an ambient light level, and an ambient noise level.

13. The mixed reality accommodation system of claim 11, wherein the one or more location-based restrictions are selected from the group consisting of government-based restrictions and private entity-based restrictions.

14. The mixed reality accommodation system of claim 10, wherein the mixed reality safety program is further configured to:
receive user action data that is selected from the group consisting of eye-tracking information, microphone information, optical sensor information, position sensor information, and biometric information;
determine a current user action based on the user action data using one or more of heuristics, an action-inference table, and programmatic rules;
select the first set of safety rules based on the current user action; and
select the second set of safety rules based on the current user action.

15. The mixed reality accommodation system of claim 14, wherein the mixed reality safety program is further configured to:
determine a user intention based on the user action data and using one or more of heuristics, an action-inference table, and programmatic rules;
select the first set of safety rules based also on the user intention, and
select the second set of safety rules based also on the user intention.

16. The mixed reality accommodation system of claim 10, wherein the holographic object comprises a first holographic object version that includes a protective safety rating and a second holographic object version that includes a permissive safety rating different from the protective safety rating, and the mixed reality safety program is further configured to:
select the first holographic object version based on the trust level; and
select the second holographic object version based on the trust level.

17. A mixed reality accommodation system, comprising:
a head-mounted display device configured to be worn by a user and operatively connected to a computing device, the head-mounted display device including a plurality of sensors and a display system for presenting holographic objects, and
a mixed reality safety program executed by a processor of the computing device, the mixed reality safety program configured to:
receive physical environment data from a physical environment via one or more of the sensors;
receive a holographic object from a source, the holographic object associated with a content provider ID that identifies the source;
receive user action data that is selected from the group consisting of eye-tracking information, microphone information, optical sensor information, position sensor information, and biometric information;

determine a current user action based on the user action data using one or more of heuristics, an action-inference table, and programmatic rules;

assign a trust level to the holographic object based on the content provider ID that identifies the source;

if the trust level is less than a trust level threshold, then:

select a first set of safety rules based on the physical environment data and the current user action, wherein the safety rules provide different levels of display restrictions for the holographic object, the first set of safety rules providing a protective level of display restrictions for the holographic object;

apply the first set of safety rules; and display the holographic object with a first level of realism via the display system according to the first set of safety rules;

if the trust level is greater than or equal to the trust level threshold, then:

select a second set of safety rules based on the physical environment data and the current user action, the second set of safety rules providing a permissive level of display restrictions for the holographic object;

apply the second set of safety rules; and display the holographic object with a second level of realism greater than the first level of realism via the display system according to the second set of safety rules, wherein the first level of realism is a first blur amount of the object and the second level of realism is a second blur amount of the object.

18. The mixed reality accommodation system of claim 17, wherein the mixed reality safety program is further configured to:

determine a user intention based on the user action data and using one or more of heuristics, an action-inference table, and programmatic rules;

select the first set of safety rules based also on the user intention, and select the second set of safety rules based also on the user intention.

* * * * *